United States Patent Office 2,945,786
Patented July 19, 1960

2,945,786

PROCESS FOR PRODUCING BUTANOL BY FERMENTATION

Motoyoshi Hongo, Fukuoka-shi, Fukuoka-ken, Japan, assignor to Sanraku Shuzo Kabushiki Kaisha, Tokyo, Japan, a corporation of Japan No Drawing. Filed Oct. 15, 1959, Ser. No. 846,568

Claims priority, application Japan Apr. 4, 1959

2 Claims. (Cl. 195—44)

This invention relates to a process for producing butanol and acetone by fermentation, more particularly a process for producing butanol and acetone which comprises culturing a certain bacterium, hitherto unknown and hereafter referred to as Clostridium saccharoperbutylacetonicum, in a mash containing carbohydrate, nitrogen source and inorganic substances, properly thereby conducting fermentation and producing much butanol and small quantity of acetone together with very small quantity of ethanol, and isolating butanol, acetone and ethanol respectively by distillation of the fermented mash.

The object of this invention is to produce butanol at high yield economically from sugar.

The production of acetone and butanol by fermentation has been known since many years ago, and an organism of the type Weizmann, Clostridium acetobutylicum, has been used. In this old process, the ratio of production of acetone to butanol is about 1:2 and the yield of butanol on the basis of supplied sugar is about 20%. Since then, a new process has been developed to obtain butanol from molasses in U.S.A. wherein strains of Saccharolytic bacteria are used. In this process, the ratio of production of acetone to butanol is 1:2.50–3.38 and the yield of butanol on the basis of supplied sugar is 21–23%, and the yield of the total solvents is 29.6–31.7% on the basis of supplied sugar. When Clostridium tetrylium is used for fermentation, somewhat better result is obtained, in which the ratio of production of acetone to butanol is 1:3.50 and the yield of the total solvents is 30.0%. However, the yield of butanol is still only 21% on the basis of supplied sugar and further there is a disadvantage in that sucrose in the material molasses must be inverted preparatory. When Clostridium madisonii is used, the production ratio of butanol to acetone is improvide and the ratio of production of acetone to butanol is 1:4.25. But the yield of butanol on the basis of supplied sugar is again only about 21% and the yield of the total solvents is also as low as 28%.

According to the development of petro-chemical industry, acetone has become to be produced economically, and the production of acetone by fermentation is now begun to be considered uneconomical. Under this circumstance, it has become necessary to produce butanol at as high rate as possible in comparison with acetone from supplied sugar. However, the concentration of butanol in a mash fermentated by butanol producing bacteria is generally about 12–13 g. per l. although in some rare cases it reaches 15 g. per l. This imposes a limitation on the process for producing butanol by fermentation.

On the other hand, it is necessary to consider the heat-economy in commercial production, and from this point of view, it is desirable to have a concentration of the solvents over 16 g. per l. in the fermented mash at the process of distillation. In order to satisfy these two conditions, it is necessary to obtain a fermented mash which contains total solvents at a rate higher than 16 g. per l. and at the same time butanol in the total solvents at a high rate.

The inventor of the present application has devoted many years to find out strains which satisfy conditions as described above, viz. collected samples of soil of various districts and isolated many bacteria from them and made tests with them. As the result, he has now succeeded in discovering a new organism, which belongs to the genus Clostridium and is denominated by him Clostridium saccharoperbutylacetonicum. This bacterium produces butanol more than 4 times as much as acetone by fermentation, the yield of butanol being more than 25% on the basis of supplied sugar. The yield of the total solvents is also as high as over 34%.

In the following, the characteristics of Clostridium saccharoperbutylacetonicum will be described in detail. The examinations thereof have been made according to the methods of tests as described in "Manual of Microbiological Methods," by the Society of American Bacteriologists.

Description of Clostridium saccharoperbutylacetonicum:

(1) Morphology (Medium: potato, glucose, ammonium sulphate, calcium carbonate, temp. 30° C., anaerobic culture by vacuum method).

Vegetative cells: (24 hours culture) Rods with rounded ends occurring singly and rarely in pairs, 0.4 to 0.8 by 3.1 to 6.2 microns. (In molasses medium occasionally becoming two or three chains and many cells twinning massed at final stage of fermentation.)
Spolangia: (48 to 72 hours culture) Spindle shaped or clavate. Spores slightly eccentric to sub-terminal or terminal.
Spores: (48 to 72 hours culture) Ellipsoidal, 0.8 to 1.5 by 1.6 to 2.2 microns.
Motility: Young vegetative cells motile actively.
Stain: Gram-positive, clostridia stained blue by iodine solution (granulose positive).

(2) Culture

Agar plate: Glucose-bouillon agar medium, temp. 30° C., anaerobic culture, 3 days after surface colonies circulate, smooth, slightly raised, entire, milky white, moist lustrous, none pigmentation.
Agar stroke: Glucose-bouillon agar medium, temp. 30° C., anaerobic culture, 3 days after several colonies on agar surface, circular, smooth, milky white, entire, moist lustrous, gas produced by white cells in condensed water, none pigmentation.
Agar stab: Glucose-bouillon agar medium, temp. 30° C., 3 days after agar fragmented along stab and agar raised up by gas production, moist milky white cells grow at the cracked surface and bottom of test tube. None pigmentation.
Bouillon broth: No growth.
Potato: Potato, glucose, ammonium sulfate, calcium carbonate mash: Temp. 30° C., 1 day after liquefied, abundant gas production, 3 days after gas production ceased, solid material precipitated, solvent odor.
Corn: Corn, ammonium chloride mash: Temp. 30° C., 1 day after gas produced, and formed so-called head weakly, 4 days after gas production ceased, solid material precipitated, solvent odor.
Koji broth: No growth.
Litmus milk: Temp. 30° C., 1 day after gas produced, casein slightly coagulated, litmus reduced, 2 days after, reddish slightly, 4 days after gas production ceased, 15 days after coagulation of casein and peptonization weak.

(3) Physiology

Relation to oxygen: Anaerobic.
Catalase: Negative.
Temperature relations: Optimum for growth 33° C. to 37° C., for solvent production 25° to 35° C., for acetone 30° to 35° C., and for butanol 25° to 28° C.
Relation of pH of medium: Opt. 5.6 to 6.7.
Gelatin liquefaction: Glucose-bouillon gelatin medium, temp. 23° C., 8 days after infundibuliform liquefaction.
Indole: Not produced.
Pigmentation: None.
Hydrogen sulfide: Negative from peptone contained medium, negative or slightly by reduction of sulphites and positive by reduction of thiosulphates.
Nitrites production from nitrates: Negative.
Ammonia production from nitrites: Positive.
Digestion of coagulated albumin: Very weak or negative.
Fermentability of carbohydrates: Acid and gas from arabinose, xylose, glucose, fructose, galactose, mannose, lactose, sucrose, maltose, melibiose, trehalose, cellobiose, raffinose, starch, dextrin, glycogen, mannitol, salicin, alpha-methyl-glucoside and pectin. Rhamnose, melezitose, inulin, glycerol, erythritol, adonitol, sorbitol, dulcitol and inositol are not fermented.

When the characteristics of the newly found bacterium as described above are compared with those mentioned in the classifications of the 5th and the 7th editions of "Bergey's Manual of Determinative Bacteriology" and those of the bacteria described in the original reports referred to in said books or patent specifications related in the past, it is noted that this bacterium belongs to the genus Clostridium but there is no species among them which has same properties as the new bacterium mentioned above to identify the same. Accordingly the microorganism is considered to be a new species. This microorganism has been deposited at American Type Culture Collection, Washington, D.C., U.S.A. and has been assigned accession number 13564 by said Depository.

The reasons for maintaining it a new species will be explained. When this new microorganism is compared with other species described in the 5th and the 7th editions of Bergey's Manual or the original reports of the bacteria or those described in various patents such as U.S. Patent 2,113,471 (1938), U.S. Patent 2,113,472 (1938), U.S. Patent 2,139,108 (1938), U.S. Patent 2,398,837 (1946) and U.S. Patent 2,439,791 (1948), it is clearly noted that this new microorganism is distinctly different from *Clostridium butyricum* and *Clostridium madisonii* in that it liquefies gelatine. In this point of liquefaction of gelatine, it resembles *Clostridium acetobutylicum* and *Clostridium saccharoacetoperbutylicum*. But it is different from *Clostridium acetobutylicum* in that the sporangium cell is greater, the optimum temperature is lower, it ferments melibiose and pectin but not rhamnose, melezitose and inulin and further in that it assimilates well ammonium salts and is suitable for fermentation of molasses and produces a mash rich in butanol as described hereafter in examples.

It is also distinctly different from *Clostridium saccharoacetoperbutylicum* in that the vegetative cell is smaller and it does not ferment inulin but trehalose and mannitol.

There is another bacterium which has similarities to the bacterium of the present invention although there is no description about liquefaction of gelatine. This is *Clostridium kaneboi*. However, the bacterium of the present invention is clearly different also from it in the size of the sporangium cell and the spore, the lower optimum temperature for fermentation, fermentation of raffinose and melibiose, non-fermentation of inulin, and high content of butanol in the fermented mash.

It is also different from *Clostridium roseum* and *Clostridium felsineum* which produce similarly the solvent and also from *Clostridium aurantibutylicum* which produces little solvent in that the spore is oval and it does not produce pigments. *Clostridium saccharobutylacetonicum-liquefaciens* is not described in Bergey's Manual, but in comparing with it, it is noted that the bacterium of the present invention is clearly different in that the vegetative cell is smaller, it ferments mannitol but not inulin and the content of butanol in the fermented mash is rich.

Accordingly the inventor considers the bacterium of the present invention is a new species and denominates this new species *Clostridium saccharoperbutylacetonicum* nov. sp.

Nextly the cultivation conditions for fermentation by the use of *Clostridium saccharoperbutylacetonicum* will be explained.

The medium used for seed-cultivation and the mash for the main fermentation have a composition containing carbohydrate, nitrogen source and minerals at a proper proportion.

For the source of carbohydrate, glucose, xylose, arabinose, sucrose, starch and materials containing the saccharides and starch as described above, for example, "High test" molasses, blackstrap molasses, sugar beet juice, beet molasses, wood sugar, waste pulp liquor, sweet potato (fresh or dried chips), corn, etc. may be used. For nitrogen source, ammonia, ammonium sulfate, ammonium chloride, ammonium phosphate, soyabean cake and hydrolysed soyabean cake may be used. For minerals, lime superphosphate, lime carbonate and the like may be used.

When the mash containing carbohydrate, nitrogen source and minerals as described above is prepared, a seed of the organism *Clostridium saccharoperbutylacetonicum* on sand is added thereto (e.g. potato, glucose, ammonium sulfate and calcium carbonate medium). It is subjected to heat-shock treatment, then anaerobic cultivation is conducted at 30° C. After 36–48 hours, the medium described above is inoculated with this culture and cultivated at a temperature from 25° C. to 35° C. until the mash begins to decrease its acidity. The time for reaching such a stage is varied depending on the temperature, the sugar concentration of the mash, the kinds of material used and other condition, but it is generally about 20–40 hours. It is preferable to make preparatory cultivation several times, preferably two to four times, for obtaining a culture to be added to a main fermentation mash.

It is preferable to have the main fermentation mash contain carbohydrate at the concentration of about 4–6% on the basis of sugar.

In the main mash, the cultivation and the fermentation are conducted at a temperature from 25° C. to 35° C. at pH of 5.5–8.0, until the residual sugar becomes less than 1%. This is one of the features of the bacterium of the present invention that a wide range of pH is used for obtaining a mash rich in butanol and there is no precedent in the past where butanol content is made rich by adjusting pH in such a wide range. The time of cultivation is generally about 2–3 days excepting the case of starch which requires a longer time, and it is advantageous in comparison with the conventional processes requiring about 3 days. After fermentation, each solvent is recovered by fractional distillation as in the conventional processes.

In the following, a few examples of the fermentation carried out by the use of the bacterium of the present invention will be described. These examples are simply for the purpose of illustration, and it is to be understood that the use of strains which have principal morphological and biological characteristics described above and are considered as varieties thereof is covered by the present invention.

Example 1

The culture on sand of *Clostridium saccharoperbutylacetonicum* is added to a medium comprising potato, glucose, ammonium sulfate and calcium carbonate, and said medium is subjected to heat-shock treatment at 100° C. for one minute, then anaerobic culture is conducted at 30° C. for 36 hours. A medium containing black-strap molasses at a concentration of 4% sugar with 0.2% of ammonium sulfate, 0.1% of calcium superphosphate and 0.3% of calcium carbonate (all the percentages are based on the medium) is inoculated with the culture in the first medium and cultivation is conducted at 30° C.

In the phase of cultivation where the acidity begins to tend to decrease, the culture is transferred to another second medium having the same composition. This transference is repeated three times and the last culture is transferred to a main mash having the same composition as the second medium described above, and the main fermentation is carried out at 30° C. After 60 hours, the result of analysis as set forth in Table 1 is obtained.

TABLE 1

[Concentration of sugar supplied: 4.03 g./100 cc.]

|  | acetone | butanol | ethanol | total solvents |
|---|---|---|---|---|
| Product, g./l. | 2.1 | 11.5 | 0.4 | 14.0 |
| Yield percent (based on supplied sugar) | 5.2 | 28.5 | 1.0 | 34.7 |

Ratio of acetone: butanol_____1:5.5
Acetone:butanol:ethanol_____15.0:82.1:2.9

Example 2

As nitrogen source in the second medium (molasses medium) 0.18% of ammonium chloride is used, but otherwise all the same conditions as Example 1 are used. The mash for the main fermentation is made to have 5.0% of sugar concentration by adding black-strap molasses and inoculated with the cultured seed. The fermentation is conducted at 30° C. for 60 hours. The result of analysis is as set forth in Table II.

TABLE II

[Concentration of sugar supplied: 5.03 g./100 cc.]

|  | acetone | butanol | ethanol | total solvents |
|---|---|---|---|---|
| Product, g./l. | 3.4 | 13.7 | 1.5 | 18.6 |
| Yield percent (based on supplied sugar) | 6.8 | 27.2 | 2.9 | 36.9 |

Acetone:butanol_____1:4.0
Acetone:butanol:ethanol_____18.4:73.7:7.9

Example 3

The seed to be inoculated is prepared in the same way as Example 2.

The mash for the main fermentation is made to have 5.5% of sugar concentration by adding black-strap molasses and is inoculated with the cultured seed. The cultivation and the fermentation are carried out at 30° C. and the result of analysis after 60 hours is as set forth in Table III.

TABLE III

[Concentration of sugar supplied: 5.57 g./100 cc.]

|  | acetone | butanol | ethanol | total solvents |
|---|---|---|---|---|
| Product, g./l. | 3.4 | 14.9 | 0.9 | 19.2 |
| Yield percent (based on supplied sugar) | 6.1 | 26.7 | 1.6 | 34.4 |

Acetone:butanol_____1:4.5
Acetone:butanol:ethanol_____17.7:77.6:4.7

Example 4

The seed is cultured in the same way as Example 2. The main fermentation is conducted at a temperature of 30° C.–27° C. The result of analysis after cultivation of 60 hours is as set forth in Table IV.

TABLE IV

[Concentration of sugar supplied: 4.82 g./100 cc.]

|  | acetone | butanol | ethanol | total solvents |
|---|---|---|---|---|
| Product, g./l. | 2.9 | 13.1 | 0.4 | 16.4 |
| Yield percent (based on supplied sugar) | 6.0 | 27.2 | 0.8 | 34.0 |

Acetone:butanol_____1:4.5
Acetone:butanol:ethanol_____17.6:80.1:2.3

Example 5

In a process of heretofore where concentrated aqueous ammonia is added instead of its salt before inoculation and during fermentation as nitrogen source, the mash obtained is generally rich in acetone, but in the process in which the bacterium of the present invention is used, a mash rich in butanol is produced even with the addition of concentrated aqueous ammonia. In Example 5, the seed is cultured in the same way as Example 2. Supplementary materials are not used in the mash for main fermentation and instead 28% aqueous ammonia is added before the inoculation at the rate of 1 cc. per 3 l. of the mash and after inoculation at the rate of 2 cc. of 28% aqueous ammonia per 3 l. of the mash when the culture reaches the stage of the highest acidity. The fermentation is conducted at 30° C. and the result of analysis after 3 days' cultivation is as set forth in Table V.

TABLE V

[Concentration of sugar supplied: 5.17 g./100 cc.]

|  | acetone | butanol | ethanol | total solvents |
|---|---|---|---|---|
| Product, g./l. | 3.0 | 13.5 | 1.2 | 17.7 |
| Yield percent (based on supplied sugar) | 5.8 | 26.2 | 2.3 | 34.3 |

Acetone:butanol_____1:4.5
Acetone:butanol:ethanol_____16.9:76.3:6.8

Example 6

18 kl. of a seed culture is prepared by the transferences of three times as in Example 1. 200 kl. of a mash for main fermentation is prepared by using 17,000 kg. of black-strap molasses, 320 kg. of ammonium chloride, 180 kg. of calcium superphosphate and 600 kg. of calcium carbonate.

After adding 18 kl. of the seed culture to the mash for main fermentation, the cultivation is begun at pH 7.3 and a temperature of 30° C. The value of pH is maintained within the range of 5.5–8.0 by adding aqueous ammonia from time to time. After the cultivation and the fermentation for 50 hours, the result of analysis is as set forth in Table VI.

TABLE VI

[Concentration of sugar supplied: 4.71 g./100 cc.]

|  | acetone | butanol | ethanol | total solvents |
|---|---|---|---|---|
| Product, g./l. | 3.0 | 12.7 | 0.6 | 16.3 |
| Yield percent (based on supplied sugar) | 6.4 | 26.8 | 1.3 | 34.6 |

Acetone:butanol_____1:4.2
Acetone:butanol:ethanol_____18.5:78.0:3.5

Example 7

The seed is cultured by transferring three times as in Example 1 for the use of inoculation. 200 kl. of a mash for main fermentation is prepared by adding 320 kg. of ammonium chloride, 200 kg. of calcium superphosphate, 600 kg. of calcium carbonate to 18,000 kg. of blackstrap molasses and pH thereof is adjusted to be about 6.5. The main mash is inoculated with 18 kl. of the cultured seed and the cultivation and the fermentation are conducted at 30° C. During the cultivation and the fermentation, pH is adjusted to be maintained within the range of 6.0–8.0 by adding aqueous ammonia from time to time. After 50 hours, the mash is analysed and the result as set forth in Table VII is obtained.

TABLE VII

[Concentration of sugar supplied: 4.83 g./100 cc.]

|  | acetone | butanol | ethanol | total solvents |
|---|---|---|---|---|
| Product, g./l | 1.9 | 12.4 | 0.2 | 14.5 |
| Yield percent (based on supplied sugar) | 3.9 | 25.8 | 0.3 | 30.0 |

Acetone:butanol ---------------------------------------------- 1:6.5
Acetone:butanol:ethanol ---------------------------------- 13:86:1

The yield of the total of solvents is relatively low but the content of butanol is particularly high.

Example 8

Fermentation of corn mash.

The culture of *Clostridium saccharoperbutylacetonicum* on sand is added to a medium comprising potato, glucose, ammonium sulfate and calcium carbonate and this medium after heat-shock treatment for 1 minute at 100° C. is cultivated anaerobically for 40 hours at 30° C. A medium comprising 7% of corn, 0.2% of ammonium chloride, 0.3% of calcium carbonate (all the percentages are based on the medium) is prepared. The seed bacterium cultivated as described above is added to the second medium and cultivated therein. The culture in the second medium is transferred to another medium of the same composition and cultivated therein again. This culture is then added to a mash for main fermentation of the same composition and cultivation and fermentation are conducted at 30° C. for 5 days. The result of analysis is as set forth in Table VIII.

TABLE VIII

[Concentration of starch supplies (measured as sugar): 4.31 g./100 cc.]

|  | acetone | butanol | ethanol | total solvents |
|---|---|---|---|---|
| Product, g./l | 2.1 | 11.8 | 0.5 | 14.4 |
| Yield percent (based on supplied sugar) | 4.9 | 27.4 | 1.2 | 33.5 |

Acetone:butanol ---------------------------------------------- 1:5.6
Acetone:butanol:ethanol ---------------------------------- 14.6:81.9:3.5

As described above, a fermented mash which is not only strikingly rich in butanol but also high in the yield of total solvents can be obtained by employing newly found *Clostridium saccharoperbutylacetonicum*.

What I claim is:

1. A process for producing butanol and acetone from a mash containing carbohydrate which comprises inoculating a mash containing carbohydrate with a culture of *Clostridium saccharoperbutylacetonicum* (accession number 13564 at American Type Culture Collection), fermenting the inoculated mash until a substantial quantity of organic solvents containing butanol at high proportion be produced, and subjecting the mash containing the organic solvents to fractional distillation to recover butanol and acetone therefrom.

2. A process for producing butanol and acetone as claimed in claim 1, which comprises forming a medium containing carbohydrate and nitrogen source, preparing a culture of *Clostridium saccharoperbutylacetonicum* by cultivating seed of *Clostridium saccharoperbutylacetonicum* in the prepared medium, and transferring two-four times the culture to a similar medium when the medium begins to reduce its titrable acidity to repeat cultivation, inoculating a main fermentation mash containing carbohydrate at the concentration from 40 g. to 60 g. as sugar per 1 l. of the mash together with nutrient materials for the bacterium including nitrogen source with the prepared culture of *Clostridium saccharoperbutylacetonicum*, conducting fermentation of the inoculated mash at a temperature from 25° C.–35° C. for 2–5 days while adding alkali from time to time to maintain the pH of the mash at 5.5–8.0 thereby producing solvents rich in butanol, and subjecting the mash containing solvents to fractional distillation to recover butanol and acetone therefrom.

No references cited.